United States Patent
Mandel et al.

(10) Patent No.: US 10,883,516 B2
(45) Date of Patent: Jan. 5, 2021

(54) FIRE PROTECTION OF A PART MADE OF A THREE-DIMENSIONAL WOVEN COMPOSITE MATERIAL

(71) Applicants: SNECMA, Paris (FR); SAFRAN, Paris (FR)

(72) Inventors: Robin Mandel, Paris (FR); Emilie Goncalves, Paris (FR); Benedicte Marie Le Borgne-Jourdan, Orsay (FR); Helene Cecile Elise Quillent, Paris (FR); Jean-Christophe Rietsch, Coudray-Montceaux (FR)

(73) Assignees: SAFRAN, Paris (FR); SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 15/110,314

(22) PCT Filed: Jan. 8, 2015

(86) PCT No.: PCT/FR2015/050039
§ 371 (c)(1),
(2) Date: Jul. 7, 2016

(87) PCT Pub. No.: WO2015/104503
PCT Pub. Date: Jul. 16, 2015

(65) Prior Publication Data
US 2016/0327061 A1    Nov. 10, 2016

(30) Foreign Application Priority Data

Jan. 9, 2014    (FR) ..................... 14 50148

(51) Int. Cl.
*F04D 29/58*    (2006.01)
*F01D 25/24*    (2006.01)
(Continued)

(52) U.S. Cl.
CPC .......... *F04D 29/5853* (2013.01); *B29C 65/02* (2013.01); *B29C 65/48* (2013.01);
(Continued)

(58) Field of Classification Search
CPC ........ F02C 7/24; F02C 7/25; B29C 66/72141; B29C 70/682; B29C 70/78; B29C 70/68–865; F04D 29/5853
See application file for complete search history.

(56) References Cited

U.S. PATENT DOCUMENTS 7,560,003 B2 * 7/2009 Naughton ............... B29C 65/58
156/292
8,182,640 B1 * 5/2012 Boone ..................... B29C 65/48
156/285

(Continued)

FOREIGN PATENT DOCUMENTS

EP    2017072 A1    1/2009
FR    2521217 A1 *  8/1983    ............... F01D 9/04
(Continued)

OTHER PUBLICATIONS

French Search Report with English Language Translation Cover Sheet, dated Oct. 6, 2014, FR Application No. 1450148.
(Continued)

*Primary Examiner* — Matthew J Daniels
*Assistant Examiner* — Andrew L Swanson
(74) *Attorney, Agent, or Firm* — Womble Bond Dickinson (US) LLP

(57) ABSTRACT

The invention relates to a method for fire protection (S) of a part (1) of a gas-turbine engine made of a composite material comprising a main fibrous reinforcement compregnated by a main matrix, the protection method (S) comprising the following steps: preforming (S1) a panel of prepreg (20) such as to grant same a shape corresponding to the
(Continued)

shape of a surface (3) of the part (1) to be protected against fire, said panel of prepreg (20) comprising a secondary fibrous reinforcement compregnated by a secondary matrix; applying (S2) the panel of prepreg (20) thus preformed to the part (1); and securing (S3) the panel of prepreg (20) to the surface (3) by thermal treatment of the part (1) provided with said panel of prepreg (20) in order to obtain a fire-protection layer (2).

15 Claims, 2 Drawing Sheets

(51) Int. Cl.
| | |
|---|---|
| *F02C 7/25* | (2006.01) |
| *B29C 65/02* | (2006.01) |
| *B29C 65/48* | (2006.01) |
| *F04D 29/02* | (2006.01) |
| *F04D 29/52* | (2006.01) |
| *F04D 29/64* | (2006.01) |
| *B29C 70/68* | (2006.01) |
| *B29L 31/00* | (2006.01) |

(52) U.S. Cl.
CPC ............... *F01D 25/24* (2013.01); *F02C 7/25* (2013.01); *F04D 29/023* (2013.01); *F04D 29/522* (2013.01); *F04D 29/644* (2013.01); *B29C 70/68* (2013.01); *B29C 70/685* (2013.01); *B29L 2031/7504* (2013.01); *F05B 2220/303* (2013.01); *F05B 2230/40* (2013.01); *F05B 2230/60* (2013.01); *F05B 2260/231* (2013.01); *F05B 2280/6003* (2013.01); *F05B 2280/6015* (2013.01); *F05D 2300/601* (2013.01); *F05D 2300/603* (2013.01); *Y02T 50/672* (2013.01); *Y02T 50/675* (2013.01); *Y02T 50/6765* (2018.05)

(56) References Cited

U.S. PATENT DOCUMENTS

| | | | |
|---|---|---|---|
| 8,322,971 B2* | 12/2012 | Coupe | B29C 70/24 139/384 R |
| 2003/0158320 A1* | 8/2003 | Kemmish | C08K 7/06 524/449 |
| 2004/0200571 A1* | 10/2004 | Yamaguchi | B29C 70/088 156/292 |
| 2005/0076504 A1 | 4/2005 | Morrison et al. | |
| 2008/0156425 A1* | 7/2008 | Howe | B62D 25/04 156/245 |
| 2015/0056433 A1* | 2/2015 | MacAdams | B32B 7/06 428/221 |
| 2015/0167498 A1* | 6/2015 | Todorovic | F01D 21/045 415/214.1 |

FOREIGN PATENT DOCUMENTS

| | | |
|---|---|---|
| FR | 2913053 A1 | 2/2007 |
| WO | WO-9948837 A1 | 9/1999 |

OTHER PUBLICATIONS

International Search Report with English Language Translation, dated Apr. 21, 2015, PCT Application No. PCT/FR2015/050039.

* cited by examiner

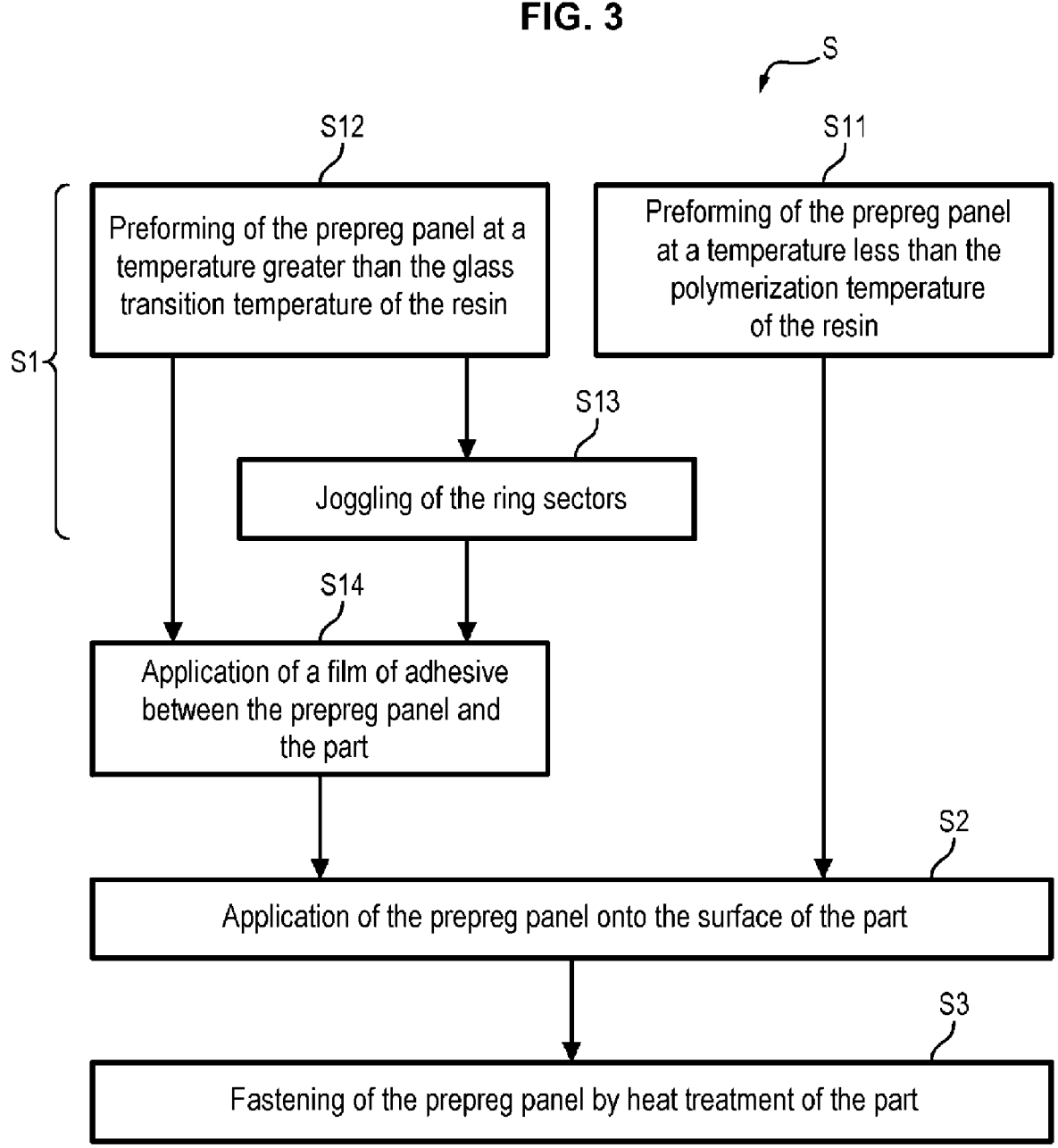

FIRE PROTECTION OF A PART MADE OF A THREE-DIMENSIONAL WOVEN COMPOSITE MATERIAL

FIELD OF THE INVENTION

The invention relates in general to a gas turbine for an aircraft engine comprising a part made of composite material comprising a fiber reinforcement densified by a matrix of a gas turbine such as a retention casing for a fan and its associated production method.

TECHNOLOGICAL BACKGROUND

A gas turbine engine generally comprises, from upstream to downstream in the direction of gas flow, a fan, one or more compressor stages, for example a low-pressure compressor and a high-pressure compressor, a combustion chamber, one or more turbine stages, for example a high-pressure turbine and a low-pressure turbine, and a gas discharge tube.

The engine is housed inside a casing comprising several parts corresponding to different elements of the engine. Therefore the fan is enclosed for example by a fan casing and comprises flanges at its axial ends. A first flange, called upstream flange, enables fastening of an air inlet sleeve to the casing, while the second flange, called downstream flange, enables the fan casing to be attached to an intermediate casing. Here, the upstream and the downstream are defined by the direction of flow of gases in the gas turbine.

The engine can especially comprise one or more parts made of composite materials, said composite materials comprising a fiber reinforcement densified by a matrix polymer.

This is particularly the case of the fan casing. For example, it has been proposed in document FR 2 913 053 to form the fiber reinforcement by winding in layers superposed on a mandrel a fiber texture achieved by three-dimensional weaving with varying thickness. This technique further integrates a retention shield into the casing by simple localized increase of thickness.

The fiber reinforcement comprises fibers, especially carbon, glass, aramid or ceramic. The matrix as such is typically a polymer matrix, for example epoxide, bismaleimide or polyimide.

However, implantation of parts made of composite material in the fire zone means responding to different regulatory requirements for fire resistance. These requirements include both maintaining mechanical properties of the part during and after fire and also immediate extinguishing of the part once fire event is over. In this way, initial fire trials on fan casings made of composite material have shown that the material used is not intrinsically self-extinguishable (or flame-retardant) and therefore requires imperative protection.

Document EP 2 017 072 has already proposed a method for manufacturing an article made of fire-resistant composite material comprising a main layer and a layer against fire made of composite material with an organic matrix, which are treated thermally simultaneously to polymerize their matrix.

In the case of the fan casing, the blank achieved after densification of the fiber preform is generally machined to produce the final geometry of the part. In particular, during this machining several millimeters are cut off the flange zone so that it is impossible to use protection against fire co-injected with the preform, as the latter would be eliminated in several zones and therefore would not sufficiently protect the fan casing against fire.

Currently known fire solutions are generally capable of covering the problem of resistance of structures to fire but do not resolve the problem of self-extinguishing. The sole known solutions ensuring self-extinguishing of parts made of composite material consist of insulating sufficiently the material to prevent it from catching fire. Yet, these solutions are not easy to implement and are bulky such that they are not possible in a gas turbine engine. manufacturing a structure made of composite material, during which a layer of CMC (ceramic matrix composite material) is preformed and applied to a mandrel then assembled with parts of the structure.

Finally, document WO 99/48837 describes a method for manufacturing an insulating coating made of ceramic material.

SUMMARY OF THE INVENTION

An aim of the invention is therefore to guarantee self-extinguishing of a part of a turbine gas engine made of composite material comprising a fiber reinforcement densified by a polymer matrix, for example a fan casing, in an industrializable manner, reliable and efficacious, without degrading the mechanical resistance of the part.

For this, the invention proposes a fire protection method for a part of a gas turbine engine made of composite material comprising a main fiber reinforcement densified by a main matrix, the protection method comprising the following steps:
  preforming of a prepreg panel so as to impart a shape corresponding to the shape of a surface of the part to be protected against fire, said prepreg panel comprising a secondary fiber reinforcement densified by a secondary matrix,
  application of the now preformed prepreg panel onto the part, and
  fastening of the prepreg panel onto the surface by heat treatment of the part fitted with said prepreg panel to produce a protective layer against fire.

Some preferred, though non-limiting, characteristics of the method described hereinabove are the following:
  heat treatment is performed at a temperature less than a degradation temperature of the part,
  the secondary fiber reinforcement comprises glass fibers,
  the secondary matrix comprises an epoxy resin, a phenolic resin and/or a cyanate ester resin, for example a resin of HexPly®M26T/50%035 type,
  the prepreg panel is preformed by ring sectors, said ring sectors being applied onto the surface of the part to be protected with overlapping,
  the secondary matrix comprises a thermoplastic resin and the preforming step comprises the following sub-steps: preforming of the prepreg panel at a temperature greater than the glass transition temperature of the thermosetting resin to impart the shape of the surface of the part to be protected; application of a film of adhesive between the preformed prepreg panel and the surface of the part to be protected; and in which the fastening step by heat treatment is configured to polymerize the film of adhesive,
  the method further comprises a sub-step during which joggling on the ring sectors is performed to ensure overlapping of the ring sectors on each other, the secondary matrix comprises a thermosetting resin and the preforming step comprises a sub-step of preforming the prepreg panel at a temperature less than the polymerization temperature of the main matrix to impart the shape of the surface of the part to be protected, and in which the fastening step by heat treatment is configured to polymerize the thermosetting resin, the protective layer comprises two superposed prepreg panels, and the prepreg panels are superposed and preformed simultaneously during the preforming step.

BRIEF DESCRIPTION OF THE DRAWINGS

Other characteristics, aims and advantages of the present invention will emerge from the following detailed description and with respect to the appended drawings given by way of non-limiting examples and in which:

FIG. 3 is a flowchart showing different steps of an exemplary embodiment of the protection method of a part of a gas turbine engine according to the invention.

DETAILED DESCRIPTION OF AN EMBODIMENT

Figure 1:
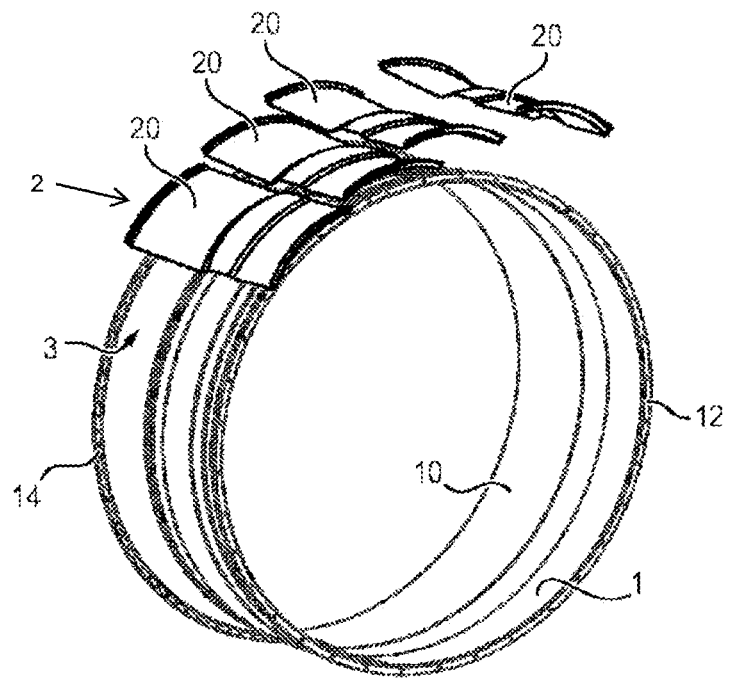
FIG. 1 illustrates an example of a part of gas turbine engine to which are applied exemplary embodiments of ring sectors of preformed prepreg panels.

In the following, the invention will be described more particularly in the case of a fan casing of a gas turbine engine, made of a composite material comprising woven fiber reinforcement, especially three dimensional, densified by a matrix polymer. But it is understood that the invention is not limited to producing such a fan casing but also covers any part of a gas turbine engine made of such composite material.

A fan casing 1 comprises an overall cylindrical barrel 10, having a main direction extending according to a longitudinal axis X substantially parallel to the gas flow. The barrel 10 of the casing can have a variable thickness, as indicated in document FR 2 913 053, and can be fitted with an upstream flange 12 and a downstream flange 14 at its upstream and downstream ends, respectively, to enable its mounting and its attaching to other parts, including the air inlet sleeve, the intermediate casing or even the annular ferrule.

The upstream flange 12 and the downstream flange 14 are annular in shape and extend coaxially to the longitudinal axis X of the fan casing 1.

The upstream flange 12 comprises an upstream radial face (facing the flow) and a downstream radial face (facing the downstream flange 14). The upstream flange 12 further comprises an annular top extending coaxially to the longitudinal axis X between the upstream face and the downstream face, at a distance from the barrel 10. Similarly, the downstream flange 14 has an upstream radial face (facing the upstream flange 12) and a downstream radial face 34 (facing the upstream face). The downstream flange 14 further comprises an annular top, extending coaxially to the longitudinal axis X between its upstream face and its downstream face, at a distance from the barrel 10.

Here, the fan casing 1 is made of composite material comprising a main fiber reinforcement densified by a main matrix. The main reinforcement can especially comprise fibers of carbon, glass, aramid or ceramic and the matrix can be made of polymer material, for example of epoxide, bismaelic or polyimide type.

The main reinforcement can be formed by winding onto a mandrel a fiber texture made by three-dimensional weaving with varying thickness as per the description of application FR 2 913 053, the fiber reinforcement constituting a complete fiber preform of the fan casing 1 formed in a single part with reinforcement parts corresponding to the flanges.

To protect the part 1 in the case of excessive rise in temperature likely to harm its proper operation, especially in the event of fire, the invention proposes applying a protective layer 2 to its surfaces 3 to be protected.

In particular, the protective layer 2 is configured to limit the extent of the zone degraded by flames and benefits its extinguishing by limiting the heat rate and the range of temperatures of the gas exhausted by degradation from the main matrix of the composite material forming the part 1.

In the case of the fan casing 1, the surfaces 3 to be protected mainly comprise the upstream radial face and the downstream radial face of the upstream flange 12, the outerl face of the barrel and the upstream radial face of the downstream flange 14.

The Applicant noted that only a small surface sensitive to fire of the fan casing 1 needs to be exposed to fire so that the whole of the fan casing 1 is degraded. So, in an embodiment, any surface of the fan casing 1 likely to be exposed to flames and having a length in the direction X greater than or equal to 2 mm is preferably protected against fire. For example, the top of the upstream flange 12 has an axial length greater than 2 mm, typically of the order of 10 mm. The top of the upstream flange 12, which is effectively likely to be exposed to fire, is therefore preferably covered by a protective layer 2.

But because the downstream flange 14 is usually scalloped and therefore intrinsically better protected against fire than the upstream flange 12, it does not necessarily require fire protection and can therefore not be covered by a protective layer 2 against fire. However, the downstream flange 14 can be covered preventively.

The protective layer 2 against fire can especially comprise one or more prepreg panels 20 comprising a secondary fiber reinforcement densified by a secondary matrix.

The protective layer 2 is preferably applied directly to the part 1, after it has been machined. Typically, in the case of a fan casing 1, the protective layer 2 can be applied after the steps of polymerizing the main matrix and machining the fan casing 1.

The prepreg panel 20 can first be preformed S1 so as to impart a shape corresponding to the shape of the surface 3 of the part 1 to be protected against fire. The prepreg panel 20 can then be applied S2 to the surface(s) 3 to be protected, and then be fixed S3 to these surfaces 3 by adapted heat treatment of the part 1.

The preforming step S1 of the prepreg panel 20 significantly reduces the time necessary for application S2 of the panel 20 to the part 1. Also, the preform ensures that the entire surface to be protected is covered, restricting the need to control the work of the operators.

In the case of the fan casing 1, which is annular in shape, the prepreg panel 20 can be preformed S1 in ring sectors. Sectoring the panel 20 makes it easy to apply on the casing to form the annular protective layer 2 and cover all of the surface 3 to be protected of the fan casing 1.

Preferably, the ring sectors are applied S2 with overlapping (that is, with partial covering of the adjacent ring sector) to improve fire protection and the mechanical resistance of the resulting protective layer 2.

Figure 2:
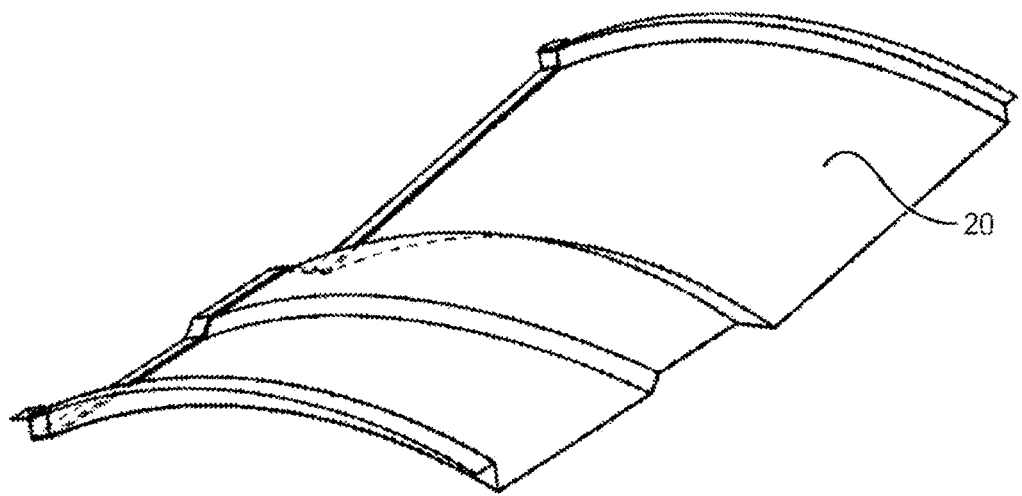
FIG. 2 is a perspective view of a ring sector of a preformed prepreg panel of FIG. 1.

An example of prepreg panel 20 in the shape of ring sectors has been illustrated in FIGS. 1 and 2.

The secondary fiber reinforcement preferably comprises glass fibers, while the secondary matrix can comprise a resin capable of thermally protecting the part 1 against fire by creating an air gap between the protective layer 2, which is directly exposed to the fire, and the part 1, and protects the part 1 by reducing the range of temperatures and the rate of decomposition gases. Typically, the most adapted resins can comprise resins capable of swelling under the effect of heat and delaminating the protective layer 2 to create the insulating air gap and reduce heat transfer inside the three-dimensional reinforcement. The extent of the degraded zone following exposure to fire is therefore more limited and the range of temperatures is less high than in the case of a part 1 not having such a protective layer 2. Given that the protective layer 2 is the first layer exposed to fire, its secondary matrix degrades, producing delaminating and creating an air gap which protects the part 1 and slows spread of the fire.

The resin of the secondary matrix is further selected such that the fastening S3 of the prepreg panel 20 on the part 1 may be achieved at a temperature less than the degradation temperature of the part 1. In the case of a fan casing 1, the degradation temperature of the part 1 is of the order of 135° C. Heat treatment must therefore be able to be done at a temperature of the order of 120° C. to 125° C. At the same time, so as not to degrade during normal operation of the engine, the resin of the secondary matrix must have a glass transition temperature greater than the operating temperature of the engine. For example, the resin can be of thermal class 180° C.

Given the above, the secondary matrix can for example comprise an epoxy resin, a phenolic resin and/or a cyanate ester resin, such as a resin of HexPly™M26T/50%035 type.

The preforming S1 of the protective layer 2 can vary as a function of the secondary matrix type making up the prepreg.

So for a secondary matrix comprising a thermosetting resin, the panel 20 is preformed S11 at a temperature less than the polymerization temperature of the resin forming the main matrix of the composite material of the part 1. The panel 20 therefore has minimal rigidity and can conform to the shape of the casing. Fastening S3 of the prepreg panel 20 to the part 1 can be achieved by conducting heat treatment of the part 1 fitted with the prepreg panel 20 to polymerize the thermosetting resin.

As a variant, the secondary matrix can comprise a thermoplastic resin. In this variant embodiment, the panel 20 is preformed S12 at a temperature greater than the melting temperature of the main matrix of the composite material of the part 1. The resulting panel 20 is therefore rigid. The fastening S3 of the prepreg panel 20 on the part 1 can be achieved by adhesion of the prepreg panel 20 on the corresponding surface 3 of the part 1, for example by means of a thermosetting resin applied S14 between the prepreg panel 20 and surface 3 of the part to be protected, such as epoxy resin. For this purpose, heat treatment of the part 1 fitted with the prepreg panel 20 is performed to polymerize the thermosetting resin.

When the panel 20 is applied in the shape of ring sectors, joggling S13 of ring sectors can be done to ensure they overlap.

Irrespective of the type of resin selected, fastening step S3 can be conducted by heat treatment (whether for polymerization of the secondary matrix or the adhesive) at a temperature less than the degradation temperature of the main matrix of the composite material of the part 1, and if needed under pressure. In the event where the resin has a polymerization temperature greater than this degradation temperature, heat treatment is therefore performed at a temperature less than the polymerization temperature of the resin. Consequently, the duration of the heat treatment must be adapted to ensure polymerization of the resin.

For example, for a conventional fan casing 1 the degradation temperature of the part 1 is of the order of 135° C. Heat treatment can therefore be carried out at a temperature of the order of 120° C. to 125° C. over a relatively long cycle time, preferably greater than 4 h to ensure polymerization of the thermosetting resin or adhesive, according to the type of secondary matrix selected.

Preferably, several panels 20 are superposed to form the protective layer 2.

When the panels 20 are applied in ring sectors on the part 1, each ring sector can therefore comprise several superposed and preformed panels 20. The preformed prepreg panels 20 are then applied to the fan casing 1, then fixed by heat treatment.

The number of superposed panels 20 can depend on the dimension of the part 1, the capacity of the prepreg selected to delay or at least slow down the onset of fire, and the total weight of the resulting protective layer 2. For example, in the case of a fan casing 1, two panels 20 can be superposed in each ring sector of the protective layer 2 to effectively protect the fan casing 1 from fire.

The invention claimed is:

1. A fire protection method for a part of a gas turbine engine, made of a composite material comprising a main fiber reinforcement densified by a main matrix, the main fiber reinforcement being three-dimensionally woven and the main matrix being polymerized, wherein the part of the gas turbine engine is a fan casing, a surface of the fan casing to be protected against fire comprising an upstream radial face and a downstream radial face of an upstream flange of the fan casing, an outer face of a barrel of the fan casing and an upstream radial face of a downstream flange of the fan casing, the upstream flange of the fan casing having a top having an axial length greater than 2 mm, the protection method comprising the following steps:
preforming of a prepreg panel so as to impart a shape corresponding to the shape of a surface of the part to be protected against fire, wherein the prepreg panel is preformed by ring sectors applied onto the surface of the part to be protected with overlapping, said prepreg panel comprising a secondary fiber reinforcement densified by a secondary matrix, a resin of the secondary matrix swelling under the effect of heat and delaminating the prepreg panel after polymerization of the prepreg panel,
application of the prepreg panel preformed onto the part, and
fastening of the prepreg panel onto the surface by heat treatment of the part fitted with said prepreg panel to produce a protective layer against fire, wherein the fastening step includes a sub-step during which joggling on the ring sectors is performed to ensure overlapping of the ring sectors on each other.

2. The protection method according to claim 1, wherein heat treatment is performed at a temperature less than a degradation temperature of the part.

3. The protection method according to claim 1, wherein the secondary fiber reinforcement comprises glass fibers.

4. The protection method according to claim 1, wherein the secondary matrix comprises an epoxy resin, a phenolic resin and/or a cyanate ester resin.

5. The protection method according to claim 1, wherein the secondary matrix comprises a thermoplastic resin and the preforming step comprises the following sub-steps:
preforming of the prepreg panel at a temperature greater than a fusion temperature of the main matrix to impart to the prepreg panel the shape of the surface of the part to be protected,
application of a film of adhesive between the preformed prepreg panel and the surface of the part to be protected,
and wherein the fastening step by heat treatment is configured to polymerize the film of adhesive.

6. The protection method according to claim 1 wherein the secondary matrix comprises a thermoplastic resin and the preforming step comprises the following sub-step:
preforming of the prepreg panel at a temperature greater than the glass transition temperature of the thermosetting resin to impart the shape of the surface of the part to be protected,
application of a film of adhesive between the preformed prepreg panel and the surface of the part to be protected,
and wherein the fastening step by heat treatment polymerizes the film of adhesive.

7. The protection method according to claim 1, wherein the secondary matrix comprises a thermosetting resin and the preforming step comprises a sub-step of preforming the prepreg panel at a temperature less than a polymerization temperature of the main matrix to impart the shape of the surface of the part to be protected, and wherein the fastening step by heat treatment is configured to polymerize the thermosetting resin.

8. The protection method according to claim 1, wherein the protective layer comprises two superposed prepreg panels.

9. The protection method according to claim 8, wherein the prepreg panels are superposed and preformed simultaneously during the preforming step.

10. The protection method according to claim 1, wherein the fan casing is machined after densification of the main matrix.

11. The protection method according to claim 1, wherein the resin of the secondary matrix has a glass transition temperature greater than 180° C.

12. The protection method according to claim 1, wherein the heat treatment is performed at a temperature of the order of 120° C. to 125° C. during a duration greater than 4 hours said part having a degradation temperature of the order of 135° C.

13. The protection method according to claim 5, wherein the film of adhesive has a polymerization temperature greater than a degradation temperature of the part, the heat treatment being performed at a temperature below the polymerization temperature of the film of adhesive, the duration of the heat treatment being adapted to ensure polymerization of the film of adhesive.

14. The protection method according to claim 7, wherein the thermosetting resin has a polymerization temperature greater than a degradation temperature of the part, the heat treatment being performed at a temperature below the polymerization temperature of the thermosetting resin, the duration of the heat treatment being adapted to ensure polymerization of the thermosetting resin.

15. The protection method according to claim 1, wherein the downstream flange is scalloped.

\* \* \* \* \*